H. B. GILLETTE.
PNEUMATIC TIRE.
APPLICATION FILED APR. 10, 1913.
1,121,917.
Patented Dec. 22, 1914.
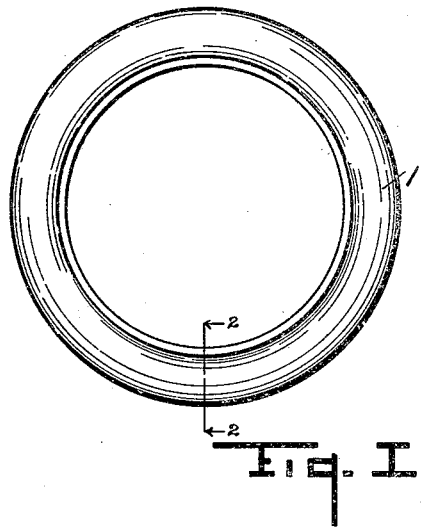
Fig. I.
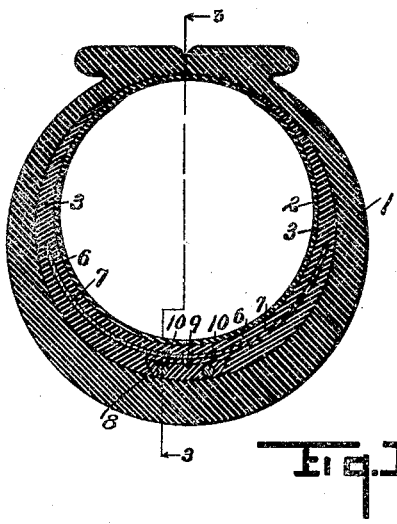
Fig. II.
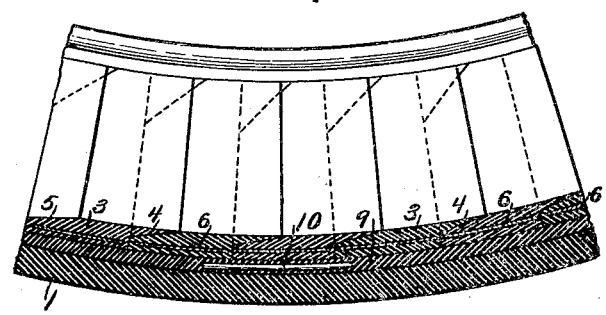
Fig. III.
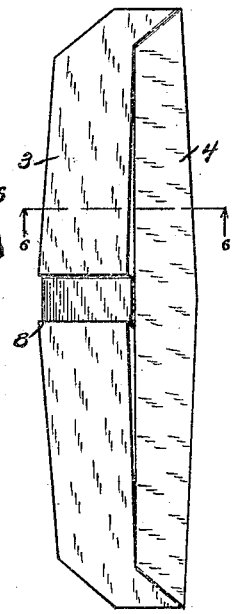
Fig. IV.
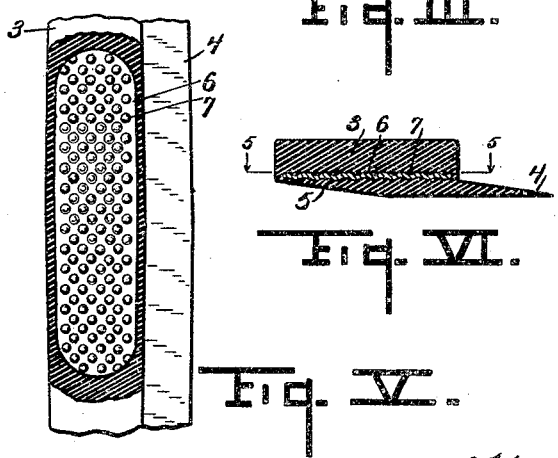
Fig. V.
Fig. VI.
Witnesses
M. L. Glasgow.
L. G. Greenfield
Inventor
Herbert B. Gillette
By Chappell & Earl
Attorneys

UNITED STATES PATENT OFFICE.

HERBERT B. GILLETTE, OF GRAND RAPIDS, MICHIGAN.

PNEUMATIC TIRE.

1,121,917. Specification of Letters Patent. Patented Dec. 22, 1914.

Continuation in part of application Serial No. 724,499, filed October 8, 1912. This application filed April 10, 1913. Serial No. 760,141.

*To all whom it may concern:*

Be it known that I, HERBERT B. GILLETTE, a citizen of the United States, residing at Grand Rapids, Michigan, have invented certain new and useful Improvements in Pneumatic Tires, of which the following is a specification.

This invention relates to improvements in pneumatic tires.

The main objects of this invention are: First, to provide an improved pneumatic tire which is very durable and is not likely to be injured by punctures or blow-outs. Second, to provide an improved tire element adapted as a protector for pneumatic tires, which does not materially affect the resiliency or elasticity of the tire, and which at the same time, effectively protects the inner or pneumatic tube. Third, to provide an improved tire element having these advantages, which may be applied to either new or used pneumatic tire casings, and one which permits the use of lighter casings than are now commonly required.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing forming a part of this specification, in which:

Figure I is a side elevation of a tire embodying the features of my invention. Fig. II is an enlarged cross section taken on a line corresponding to line 2—2 of Fig. I. Fig. III is an enlarged detail longitudinal section on a line corresponding to the broken line 3—3 of Fig. II. Fig. IV is an outside view of one of the protector members 3. Fig. V is a detail view of one of the members 3 with parts broken away to show the arrangement of the armor member 6 therein. Fig. VI is a cross section through one of the members 3, on a line corresponding to line 6—6 of Fig. IV.

In the drawing, similar reference characters refer to similar parts throughout the several views, and the sectional views are taken looking in the direction of the little arrows at the ends of the section lines.

Referring to the drawing, the outer casing 1 is shown in conventional form and for convenience, is illustrated as being formed of rubber. Any suitable casing may be used. The inner or pneumatic tube 2 is of the usual form.

My improved protector element comprises a plurality of protector members 3 which are formed of rubber or other suitable resilient material, preferably comparatively soft rubber. These members are in practice about two inches long, but the length may be varied considerably. When arranged within the casing, the arms of the members extend to substantially the top of the casing, as shown in Fig. II.

The protector members 3 are interiorly beveled at 5 at one end and provided with joint tongues or laps 4 at the other, the joint tongues or laps being wedge-shaped or tapered to fit into the bevels of the adjacent members. These lapped joints are substantially the same as those of the structure shown in my application for Letters Patent filed October 8, 1912, Serial Number 724,499, my present invention being an adaptation and in some respects, an improvement upon the structure there illustrated.

The members 3 have notches 8 in their bases or outer sides engaging the ring 9. The ring 9 is preferably secured within the tread of the outer casing 1, it being in effect, when so secured, an annular rib therein. The members 3 are arranged on this ring with their notches engaging the same end to end, and with their joint members 4 lapping or fitting into their bevels 5.

The ring 9 is preferably flat and dove-tailed in cross section, as shown, and is formed of resilient material, preferably rubber. The ring 9 is in practice, cemented to the outer casing, the ends of the ring being brought together and jointed by dowels 10. The notches 8 of the members 3 are preferably dove-tailed to more effectively engage the ring.

Thin spring metal armor members 6 are embedded within the protector members, the armor members being disposed centrally across the base of the protector members with their edges spaced from but adjacent to the ends of the protector members, and their ends terminating in the side portions or arms of the protector members; that is, they extend well across the tread of the tire and up to the sides thereof, preferably terminating at the sides, as shown in Fig. II.

The protector members and their armor members are formed substantially flat or straight, as shown in Fig. IV, so that when arranged on the ring 9, their tendency to straighten grips the ring and they press outwardly against the walls of the casing when arranged therein.

The armor members are preferably indented to provide projections 7 on their under surfaces. These indentations and projections perform a double function, one being that the rubber molded thereon securely engages the same, and the other, that the projections on their under surfaces tend to deflect a nail or the like which might pierce the casing and one of the protector members.

The protector members are placed within the casing under compression so that they are held in contact by their own resiliency. They may be placed upon the supporting or articulating ring 9, either before or after placing within the casing. While I prefer to secure the rib or articulating ring 9 by cementing it to the casing as the structure is more satisfactory in operation, the protector element is of advantage for use when the ring is unsecured to the casing. With the parts thus secured within the casing, they cannot shift about therein and they form a continuous protector for the inner tube 2. When the inner tube is expanded, the protector members form a continuous support therefor.

In the event of the outer casing being punctured, as by a nail or the like, the point of the nail engaging one of the protector members, the member will ordinarily yield before being punctured. Should it puncture the member and engage the armor member thereof, it is stopped or deflected. Should the nail engage between the armor members, the nail is ordinarily deflected by the yielding of the members and the joint laps or tongues before it reaches the inner tube and is embedded in one or the other of the joint members. In the event of cuts or like openings in the outer casing, the protector members effectively bridge the opening and prevent the inner tube blowing out therethrough. The outer casing is also protected by the protector members as it is known that in the event of the outer casing being punctured, the break formed by the puncture on the outer side of the casing is the starting point for wear between the inner tube and casing, and the casing is frequently weakened by this wear so that blow-outs occur. The protector element so effectively relieves strain on the outer casing that thinner outer casings may be used if desired, which is of great advantage as the cost of outer casing depends quite largely on the number of plies therein. A further advantage of my structure is that it supports the outer casing to a considerable degree so that it is not likely to be injured when deflated.

Generic claims to certain features of my invention are found in my companion application filed December 6, 1913, Serial No. 805,177.

Having thus described my invention, what I claim is new and desire to secure by Letters Patent is:

1. In a tire, the combination with an outer casing and a pneumatic tube, of a protector element interposed between the casing and tube comprising a ring secured within the tread portion of the casing, said ring being flat and dove-tailed in cross section, and members of resilient material having dove-tailed notches in their bases engaging said ring, the ends of the protector members when disposed within the tire extending substantially to the top, said protector members having embedded spring metal armor members disposed centrally across their bases with edges spaced from but adjacent to their edges and ends terminating in each side portion adjacent to the longitudinal center thereof, said protector members and their armor members being formed substantially straight, whereby they tend to press outwardly when arranged within the casing and to grip said ring.

2. In a tire, the combination with an outer casing and a pneumatic tube, of a protector element interposed between the casing and tube comprising a ring secured within the tread portion of the casing, said ring being flat and dove-tailed in cross section, and members of resilient material having dove-tailed notches in their bases engaging said ring, said members being arranged on said ring with their ends abutting and being interiorly beveled at one end and provided with corresponding tapered joint tongues at the other end fitting the bevels of adjacent members, the ends of the protector members when disposed within the tire extending substantially to the top, said protector members having embedded spring metal armor members disposed centrally across their bases with edges spaced from but adjacent to their edges and ends terminating in each side portion adjacent to the longitudinal center thereof, said protector members and their armor members being formed substantially straight, whereby they tend to press outwardly when arranged within the casing and to grip said ring.

3. In a tire, the combination with an outer casing and a pneumatic tube, of a protector element interposed between the casing and tube comprising a ring secured within the tread portion of the casing, and normally flat members of resilient material having notches in their bases engaging said ring, said members being arranged on said ring with their ends abutting, the ends of the protector members when disposed within the tire extending substantially to the top, said protector members having embedded spring metal armor members disposed centrally across their bases with ends terminating in each side portion adjacent to the longitudinal center thereof.

4. In a tire, the combination with an outer casing and a pneumatic tube, of a protector element interposed between the casing and tube comprising a ring secured within the tread portion of the casing, and normally flat members of resilient material having notches in their bases engaging said ring, said members being arranged on said ring with their ends abutting and being interiorly beveled at one end and provided with corresponding tapered joint tongues at the other end fitting the bevels of adjacent members, the ends of the protector members when disposed within the tire extending substantially to the top, said protector members having embedded spring metal armor members disposed centrally across their bases with ends terminating in each side portion adjacent to the longitudinal center thereof.

5. In a tire, the combination with an outer casing and a pneumatic tube, of a protector element interposed between the casing and tube comprising a ring secured within the tread portion of the casing, and members of resilient material having centrally disposed notches in their outer sides engaging said ring, said members being arranged on said ring with their ends abutting and being interiorly beveled at one end and provided with corresponding tapered joint tongues at the other end fitting the bevels of adjacent members, said protector members having embedded spring metal armor members disposed centrally across the tread portions thereof, said protector members and armor members being formed substantially straight, whereby they tend to press outwardly when arranged within the casing and to grip said ring.

6. In a tire, the combination with an outer casing and a pneumatic tube, of a protector element interposed between the casing and tube comprising a ring secured within the tread portion of the casing, and members of resilient material having centrally disposed notches in their outer sides engaging said ring, said members being arranged on said ring with their ends abutting and being interiorly beveled at one end and provided with corresponding tapered joint tongues at the other end fitting the bevels of adjacent members, said protector members having embedded spring metal armor members disposed centrally across the tread portions thereof, said protector and armor members being under tension in said casing whereby they tend to press outwardly within the casing.

7. An element for pneumatic tires comprising a ring, and members of resilient material having notches in their bases engaging said ring, said members being arranged on said ring with their ends abutting and being interiorly beveled at one end and provided with corresponding tapered joint tongues at the other end fitting the bevels of adjacent members, said protector members having embedded spring metal armor members disposed centrally across their bases with the edges spaced from but adjacent to their edges and ends terminating in each side portion adjacent to the longitudinal center thereof, said protector members and their armor members being formed substantially straight, whereby they tend to grip said ring.

8. An element for pneumatic tires comprising a ring, and normally flat members of resilient material having notches in their bases engaging said ring, said members being arranged on said ring with their ends abutting, said protector members having embedded spring metal armor members disposed centrally across said notches in their bases with the edges spaced from but adjacent to their edges and ends terminating in each side portion adjacent to the longitudinal center thereof.

9. An element for pneumatic tires comprising a ring, and a plurality of members of resilient material having notches in their bases engaging said ring, said members being arranged on said ring with their ends abutting and being interiorly beveled at one end and having corresponding joint tongues at the other fitting the bevels of adjacent members, said members having embedded spring metal armor members extending across the tread portions thereof, said protector members and armor members being formed substantially straight, whereby they tend to press outwardly when arranged within a casing and to grip said ring.

10. In a tire the combination with an outer casing of a pneumatic tube, a protector element interposed within the casing and tube comprising a ring, and a plurality of members of rubber having notches in their bases engaging said ring, and embedded spring members disposed centrally across the notches and extending into their side portions said spring members being placed under stress when the members are supported in a curved position by the casing, all coacting for the purpose specified.

11. In a tire the combination of an outer casing and a pneumatic tube of a protector element interposed between the casing and tube comprising a ring secured to the tread portion of the casing, and members of rubber having notches in their bases engaging said ring and joint laps on their ends, and having spring members disposed across their notches, said spring members being placed under stress when the members are supported in a curved position by the casing, all coacting for the purpose specified.

In witness whereof, I have hereunto set my hand and seal in the presence of two witnesses.

HERBERT B. GILLETTE. [L. S.]

Witnesses:
R. B. GILLETTE,
WILLIAM R. BRINCKERHOFF.

Copies of this patent may be obtained for five cents each, by addressing the "Commissioner of Patents, Washington, D. C."